Nov. 22, 1955   V. T. WIGLESWORTH   2,724,204
LINE GUIDE TIP FOR FISHING RODS
Filed June 12, 1952
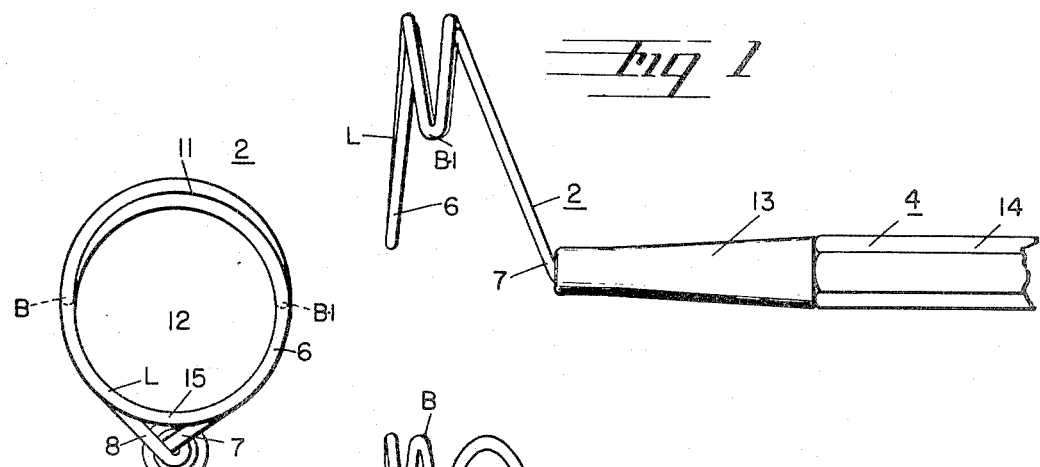
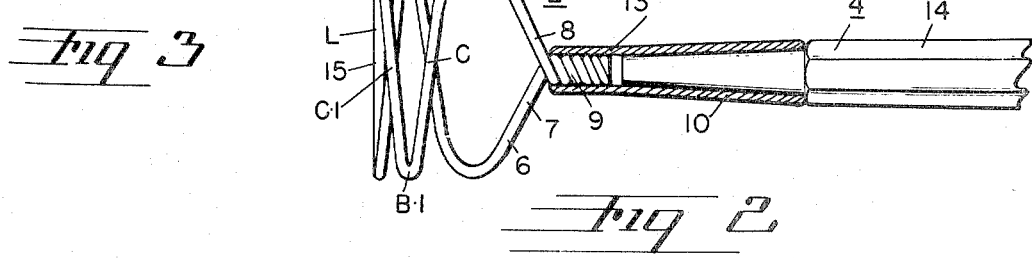
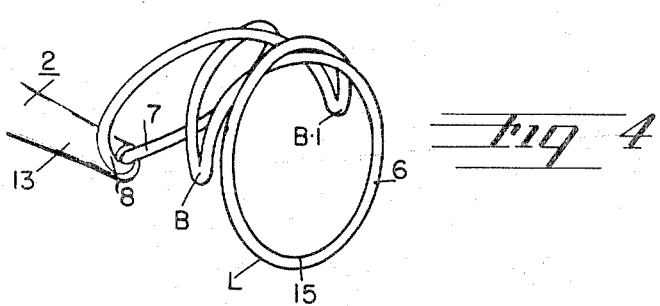
INVENTOR.
Victor T. Wiglesworth United States Patent Office 2,724,204
Patented Nov. 22, 1955

2,724,204

LINE GUIDE TIP FOR FISHING RODS

Victor T. Wiglesworth, Portland, Oreg., assignor of two and one-half per cent to Frank E. Schofield, Portland, Oreg.

Application June 12, 1952, Serial No. 293,123

2 Claims. (Cl. 43—24)

This invention relates to line guide tips for fishing rods and the like; in particular to wire wound line guide tips having the feature of sidewise line entry.

The primary object of my improvement is to provide the art with a line guide tip of wound structure which allows complete radial movement of a line around the outer end periphery of the guide without the hazard of tangling or snagging.

Another object of the present invention is to provide a wire wound line guide tip characterized as having only a single wire surface presented to a running line.

A still further object of my invention is to complement and expand the advantages of the sidewise line entry guide set forth in my pending application Serial Number 271,083, filed on the 12th of February, 1952, which issued as Patent No. 2,702,959.

In the accompanying drawings:

Figure 1 is a side elevation of my line guide tip, showing the line guide in place on the end of a fishing rod or the like;

Figure 2 is a plan view of the improvement shown in Fig. 1, as viewed from above;

Figure 3 is a front elevation view of the device shown in Figure 1;

Figure 4 shows in perspective view of the various associated wire windings which result in the device.

Describing the accompanying drawings more in detail: The numeral 2 designates the guide tip in place on a suitable fishing pole or the like 4, the guide tip being constructed of a single length of wire 6 of suitable size and physical characteristics.

The line guide tip is formed of a single length of wire which is folded on itself at L in such a manner that its free ends 7, 8 converge, said converging ends being fastened together at 9 and encased in a suitable holding ferrule 10, the portions of the wire between the converging end portions 7, 8 and the fold L defining additional folds B, $B_1$ which extend in opposite directions and overlap at points C, $C_1$ to provide a pair of spaced loops with the ends of said additional folds lying substantially in the same plane and with the sides of said additional folds diverging in such a manner that the angles of divergence face each other.

By forming my guide tip in this manner it is noted that the fold converging points B and $B_1$ are oppositely disposed, with reference to a plane through its center points C, $C_1$ of the device. The loop windings from B underlapping the loop windings from $B_1$ at points C—$C_1$ respectively and thus a line passage space 11 is provided between the loop windings at the points C—$C_1$; the loop windings beginning from $B_1$ are bent up and over the loop windings from B, in such a manner as to provide the passage space 11 at the points C—$C_1$, as illustrated in Figure 3.

The threading of a line into my guide tip is easily accomplished by merely holding the line horizontally and slipping the line into the guide under point $B_1$ and then moving the line through passage 11 at the cross over center points C—$C_1$, and finally over the point B, gaining entry to the eye center 12.

To unthread the line the reverse operation is used, or, the line may be pulled through in the conventional manner if feasible or desired.

By means of the guide tip construction angular loop windings from the ends 7—8 to the center C tend to allow any tangled line to move forward up and over the center point C, maintaining the line free from horizontal loop entanglement around the rod tip loops. The forward loop L allows a line complete free radial movement without any obstruction, and also provides but a single bearing point 15 for the line to run against thereby lessening the friction against the line and its motion.

My line guide tip may be formed of various equivalents and while I believe that a single wire wound into the device is superior in many ways, I do not limit myself to a single strand or wire, as it is obvious that a plurality of strands of the same or dissimilar materials may be employed, e. g., combinations of plastic and metal strands, plastic coated metal wire, and the like.

What I claim is:

1. A line guide tip comprising a single length of wire folded on itself and having its free end portions converging; said converging portions being adapted to be received within a ferrule of a rod, the portions of the wire between the converging end portions and the bold defining additional folds which extend in opposite directions and overlap to provide a pair of spaced loops with the ends of said additional folds lying substantially in the same plane, the sides of said additional folds diverging and with the angles of divergence facing each other.

2. A fishing line guide as set forth in claim 1 wherein one of said loops is substantially circular shaped and said additional folds are substantially semicircular shaped when viewed from the end of the guide.

References Cited in the file of this patent

UNITED STATES PATENTS

| 1,844,044 | Pflueger | Feb. 9, 1932 |
| 2,388,239 | Decker | Nov. 6, 1945 |

FOREIGN PATENTS

| 555,940 | France | July 9, 1923 |
| 921,474 | France | May 8, 1947 |